Patented Aug. 15, 1939

2,169,368

UNITED STATES PATENT OFFICE 2,169,368

OXIDIZING AGENT AND METHOD OF MAKING

Wallace J. Murray, Dedham, and Earl P. Stevenson, Newton, Mass.

No Drawing. Application June 12, 1936, Serial No. 84,898

24 Claims. (Cl. 260—369)

This invention relates to a class of oxidizing agents soluble in organic solvents, and to the procedure for preparing and utilizing these agents.

The technique of oxidation is of fundamental importance in synthetic organic chemistry. Most of the oxidizing agents in common use are of inorganic character, for example, oxygen gas, ozone, nitric acid, chromic acid, permanganic acid, and hydrogen peroxide. Reactions in which these and similar substances have been used as oxidizing agents have been heterogeneous; that is, there has been present either a gas-liquid, liquid-liquid, gas-solid, or liquid-solid interface. Heterogeneous reactions are more difficult to control than homogeneous reactions, where all the reactants are in solution in a single phase, and hence no interfaces exist. It is, therefore, desirable to have means of conducting oxidations in solution.

We have discovered that by virtue of the extraordinary resistance of tertiary alcohols to oxidation and of the ease with which they form esters with oxidizing acids, it is possible to prepare oxidizing solutions of a new and useful type, characterized by the property of dissolving and being soluble in a large variety of organic substances including even the non-oxygen containing organic solvents such as the stable chlorinated solvents (carbon tetrachloride)—and the stable hydrocarbon solvents (e. g., benzol)—and hence especially adapted for carrying out homogeneous oxidizing reactions. Tertiary alcohols are alcohols in which the hydroxyl group is bound to a carbon atom which is bound to three other carbon atoms, and are not readily oxidized. This invention will be described in the examples with specific reference to the use of tertiary butyl alcohol which is the lowest member of the series and the most readily available, but it should be understood that this invention is not limited to the use of tertiary butyl alcohol as the only tertiary alcohol.

For the purpose of explaining and claiming our invention we define oxidizing acids as substances containing more than one atom of oxygen, which are preferably capable of forming esters with tertiary alcohols, and further characterized by the property of liberating a visible amount of iodine upon the addition of a small amount of the same to an aqueous solution containing 1% of sulphuric acid and 1% of potassium iodide within ten minutes at 25° C. Chromic, perchromic, manganic, permanganic, and persulfuric acids, and hydrogen peroxide are examples of such oxidizing acids. The true "per" acids are included herein. These acids typically give hydrogen peroxide when treated with mineral acids or subjected to hydrolysis. They include, as well as "per" acids of chromium and sulfur already mentioned (permanganic acid is not a true "per" acid), the "per" acids of boron, molybdenum, vanadium, etc.

It is already known that hypochlorous acid and certain other oxidizing acids containing only one oxygen atom readily form fairly stable esters with tertiary butyl alcohol, and that these esters may be used as oxidizing agents and for other purposes.

In the case of hypochlorous acid, the free acid is extremely unstable, and must be used at once. In the case of acids containing more than one oxygen atom, the stability is greater than in the case of those acids containing only one oxygen atom. Furthermore, the esters with tertiary alcohols of the acids containing more than one oxygen atom are soluble or miscible in both organic solvents and in water, while those containing only one oxygen atom are insoluble in water. The esters of hypochlorous or hypobromous acid with tertiary alcohols also have the disadvantage that they tend to halogenate or otherwise react with the materials to be treated; whereas the oxidizing compounds described and claimed in this invention are limited in their effect to purely oxidizing reactions, i. e., wherein they give up only oxygen to oxidize the materials to be treated.

Our discovery that oxidizing acids containing more than one atom of oxygen in the molecule can be mixed with tertiary alcohols without immediate oxidation, the methods to be described for preparing oxidizing solutions of oxidizing acids in tertiary alcohols, and the use of such solutions in oxidation reactions, and for purifying the oxidizing acids, are new.

The compounds of this invention, although generally unstable in pure form at high temperatures, and in some instances even at room temperature, may be effectively stabilized by an excess of the tertiary alcohol. The tertiary alcohol also acts as a mutual solvent for the compound and for the material to be oxidized, as it is a very satisfactory solvent for a wide range of chemical compounds.

The compounds of this invention are typically prepared as follows: The oxidizing acid, as such or as prepared from a compound thereof, is preferably introduced into the tertiary alcohol, and any ancillary diluents or by-products formed are preferably eliminated from the reaction mixture, at any suitable time during or after the formation of the compounds of this invention. If the oxidizing acid is available as such in the first instance, it is necessary only to react it with the tertiary alcohol. Water formed by the reaction may be removed by salting out, if desired. If, on the other hand, the oxidizing acid is available as a compound thereof,—e. g., as its sodium salt,—it is then first advantageously treated with an acid, in a water solution, and the whole is then added to and mixed with the tertiary alcohol. The alcohol and the oxidizing acid (which latter is produced by the added acid) react to form the compound of this invention, while the sodium salt of the added acid, together with the reaction product, tend to pass into a separate phase which may be readily removed by a salting-out process, such as by adding a water-soluble salt.

These reactions can best be illustrated by a series of examples, which now follow. These are given in detail; some show merely the preparation of the oxidizing compounds of solutions of this invention; others show this preparation as a means of preparing a pure product from a material which is originally available as a compound of, or associated with, some undesired element or constituent.

Following these examples there will be given a discussion of various uses of the oxidizing compounds or their solutions.

The products of this invention are referred to as "compounds" or "esters" of oxidizing acids and tertiary alcohols, it being understood, however, that the formation of definite compounds of this type is not always easily demonstrated. Without going into the theory of the formation of these "compounds", it may definitely be stated that association between the oxidizing acid and the tertiary alcohol is present, and this associated product is referred to herein under the term "compound". Actual compound formation is indicated by the fact that the product of this reaction is readily soluble in solvents in which the free acid is insoluble.

EXAMPLE I

*Preparation of tertiary butyl chromate and of pure chromic acid*

This example will show a commercial method for making pure chromic acid, starting with chrome ore. The preparation of tertiary butyl chromate in connection with this method will be shown; also the preparation of tertiary butyl chromate from chromic acid as a starting material. Various aspects of this invention not hitherto described will also be brought out in this example, which will hence go into considerable detail for effective consideration of these several points.

In the usual preparation of chromium trioxide, $CrO_3$, (generally referred to as chromic acid), from chrome ore, it is customary to convert the chromium content into sodium bichromate, which is in turn converted into chromic acid by treatment with sulfuric acid. The resulting product contains in addition to the chromic acid, sodium bisulfate, and while these two substances may be separated by various methods, the methods so far proposed or in use have had various drawbacks in the way of difficulty of operation, cost, purity of product, etc. As a result of the inherent difficulties characteristic of this prior art process, the chromic acid is either very expensive to produce in satisfactory form or else contains undesirable impurities which subsequently deleteriously affect the quality of the chromic acid.

Broadly, therefore, this invention includes as an object the extraction of materials (such as chromic acid) normally reactive with primary or secondary alcohols, with a tertiary alcohol, and separating the resulting alcoholic solution from the residual materials; then utilizing this solution (e. g., tertiary butyl chromate, in this example) either as such for useful chemical reactions such as oxidations, or in the form of its reactive component (e. g., $CrO_3$), which is recovered from the solution by a method herein disclosed. This reactive component may, of course, be used in well-known ways, or it may if desired be later mixed with a tertiary alcohol to form the useful solution already described in connection with oxidizing reactions.

The process as applied to the preparation of tertiary butyl chromate and chromic acid is conveniently divided into five steps but since it is continuous and is in part a closed system, there is no well-defined starting place. For convenience, however, the first step to be described will be that in which is used, for example, 2500 gallons of a 70% solution of sodium bichromate. This will be called solution A. To a portion, for example, one-fifth, of this solution A is added a mixture of sufficient 66° Bé. sulfuric acid and 500 gallons of water to convert the sodium bichromate to normal sodium sulfate. This reaction takes place, forming the sodium sulfate and chromic acid, together in the water solution. (This will be called solution B.)

The second step is extraction of solution B with tertiary butanol. Solution B should be cooled, at least to room temperature, before doing so, however, as even with a relatively stable alcohol such as tertiary butanol, there is danger of reactions of explosive violence if the alcohol and chromic acid are together at high temperature and too highly concentrated. In order to avoid such heating or concentration, the solutions are kept at approximately room temperature, and solution B is preferably run in the form of fine drops into the tertiary butanol. Upon settling through the alcohol, the chromic acid content of the drops is selectively absorbed from them and dissolved by the alcohol. This may all be done in one tank, or by a series of tanks operated countercurrently. The latter method increases the efficiency of extraction and reduces the amount of tertiary butanol used. The temperature, as already mentioned, should not be too high, preferably not over 30° C. to 35° C., and the chromic acid concentration should not be substantially over 5% to 10%. Also, the temperature should not be lower than about 25° C., as crystallization of some of the substances present will result at lower temperatures. After the extraction is complete, there are two separate solutions, one being an aqueous solution of sodium sulfate, and the other a solution of tertiary butyl chromate in tertiary butanol containing a small amount of sodium sulfate and water. This latter solution will be called solution C. The former solution (sodium sulfate in water) which is removed from the system, may be evaporated to produce Glauber's salt ($Na_2SO_4.10H_2O$).

The third step consists in treating solution C for removal of the sodium sulfate and water which it contains. This de-sulfating and dehydrating is accomplished by adding a concentrated (70%) solution of unacidified sodium bichromate to solution C. This does not affect the chromate content of the tertiary butanol, but serves to remove the sulfate and water therefrom. This bichromate treatment is conveniently carried out by passing into the saturated bichromate solution, solution C, in the form of fine drops. As de-sulfating and dehydrating proceeds, the bichromate-sulfate-water phase, in picking up water from solution C, tends to become diluted. This tendency is counteracted by adding enough sodium bichromate crystals to keep the solution saturated with respect thereto. This is the point in the system where the bichromate is actually added. In actual practice, solution A is the saturated aqueous sodium bichromate solution (together with a little sulfate) which has just been described as the de-sulfating solution; when this solution is sufficiently augmented by the addition of bichromate crystals, and of water and sulfate from solution C, a portion (say one-fifth, to follow the example) is drawn off and treated as described in step one. The small amount of sodium sulfate present is immaterial to the further reaction, and passes out as Glauber's salt as described at the end of step two.

The fourth step is dilution. The chromic acid-tertiary butanol phase resulting from the third step is drawn off as it accumulates, and for safety in handling or storage may be diluted with either water or tertiary butyl alcohol, depending upon the intended use of the solution. This gives solution D, which may be used in the oxidation reactions described above. If it is desired to separate out the pure chromic acid from the alcohol, the fifth step in the process is performed.

The fifth step consists in distilling solution D, for example, in a continuous fractionating column. This distillation drives off the tertiary butanol, which is circulated back to enter the process at the beginning of step two. After distillation there is left an aqueous solution of chromic acid, which may be evaporated or spray-dried, or otherwise conveniently treated, to obtain the desired dry $CrO_3$ crystals.

The tertiary butyl chromate oxidizing reagent may also be prepared in a similar manner from commercial chromic acid. For example, a dilute aqueous solution of chromic acid may be prepared, and tertiary butanol added thereto. A salt, such as sodium sulfate or sodium chloride, may now be added to the solution and a tertiary butanol chromate is "salted out"; that is, separated due to its immiscibility with a concentrated salt solution. The chromic acid may be separated out, in the pure state, in accordance with the fourth and fifth steps described above.

The reaction to form tertiary butyl chromate may be conveniently represented thus, or in some similar manner.

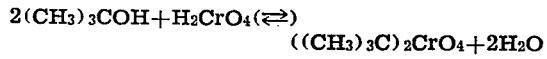

$$2(CH_3)_3COH + H_2CrO_4 (\rightleftarrows)$$
$$((CH_3)_3C)_2CrO_4 + 2H_2O$$

This reaction is reversible; hence the reactions of the foregoing example are readily explained according to the law of mass action,—e. g., an excess of the tertiary alcohol drives the reaction to the right, an excess of water drives it to the left. These effects are augmented if one of the four constituents is removed.

EXAMPLE II

*Preparation of tertiary butyl permanganate*

The basic principles set forth in the foregoing example for preparing tertiary butyl chromate are equally applicable to the preparation of tertiary permanganates. However, manganese heptoxide is more strongly oxidizing than chromic acid, $CrO_3$; it is apt to decompose with violence, giving $MnO_2$ and oxygen.

As tertiary butyl permanganate is consequently less stable than the corresponding chromate, it is unlikely to be suitable for large-scale commercial production. Its manufacture on a smaller scale, using the principles laid down in Example I, may be carried out as follows:

A solution is made up from the following ingredients:

| | | |
|---|---|---|
| Potassium permanganate | grams | 14 |
| Sulfuric acid (conc.) | do | 10 |
| Water | cc | 130 |

Not all the permanganate goes into solution at first, although most of it does during further treatment described below. This solution is cooled and poured slowly on to about 125 grams of tertiary butanol. This latter, if pure, will be frozen, as its freezing point is about 25° C. Presence of a small amount of water in it will do no harm, and will result in a lower freezing point. The whole mixture is thoroughly stirred, in the cold, and a deep purple, homogeneous liquid is produced. Then about 100 grams of solid sodium acid sulfate are added, with stirring; thereupon the liquid separates into two phases. While this is not identical with the procedure described for the chromic acid process, the principle is the same. Sodium bichromate is very soluble; potassium permanganate is only slightly soluble. Hence when the tertiary butyl permanganate is made there is relatively much more water to be separated than in the case of tertiary butyl chromate. This is the reason for the further and separate addition of a salt for salting-out purposes. This procedure could be followed, if desired, in the preparation of tertiary butyl chromate, if like conditions of excess water should be present. Other salts can be used, in place of sodium acid sulfate, for the purpose of salting-out.

The upper layer of the resulting two-phase liquid is a deep purple solution of tertiary butyl permanganate in tertiary butanol. The bottom layer contains the sulfates and acid sulfates of potassium and sodium formed from the reaction, also a little manganese dioxide and any undissolved potassium permanganate. The tertiary butyl permanganate is less stable than the chromate, but may be kept for a short period at ice temperature. On longer standing, $MnO_2$ is deposited and oxidation products produced. This, however, proceeds quietly, without violence, in the case of the specific example given. In spite of its limited stability tertiary butyl permanganate can be used as a very powerful oxidizing agent, or, by dilution with water, as a source of permanganic acid free from inorganic salts. It should be prepared fresh for use, and used substantially immediately. Concentrated solutions, consisting of tertiary butyl permanganate in relatively small amounts of tertiary butanol and/or water, should be avoided, or handled with precaution at low temperatures, as they may react with explosive violence.

Sufficient examples and details have already been given to show the methods of preparing the compounds of this invention. Some additional examples will be presented briefly, for the purpose of showing the wide range of oxidizing acids and their compounds which may be utilized in this process.

EXAMPLE III

*Preparation of tertiary butyl persulfate*

Ammonium persulfate, $(NH_4)_2S_2O_8$ is dissolved in ice-cold, concentrated sulfuric acid. The resulting permonosulfuric acid (Caro's acid, $H_2SO_5$) forms a reaction compound with tertiary butyl alcohol when mixed with the latter, and this compound is suitable for use as an oxidizing agent or as a source of pure permonosulfuric acid, in accordance with procedures described in the previous examples, particularly Example II.

EXAMPLE IV

*Preparation of tertiary butyl pervanadate*

Ammonium pervanadate (which may be made by treating ammonium vanadate with 30% $H_2O_2$ in the cold) is dissolved in ice-cold concentrated sulfuric acid. The resulting pervanadic acid, $HVO_4$, forms a reaction compound with tertiary butyl alcohol when mixed with the latter. The further comments under Example III apply here also.

EXAMPLE B

*Preparation of tertiary butyl permolybdate*

The procedure is the same as under Example IV. Ammonium permolybdate, made, for example, by the reaction of ammonium molybdate and 30% $H_2O_2$ in the cold, is a suitable starting material.

The method of procedure for obtaining the oxidizing acid or its anhydride in pure condition has been described in Example I. The principle there disclosed,—namely, the dilution with water of the compound of the tertiary alcohol and the oxidizing acid, followed by distilling off the tertiary alcohol and then evaporating the water,—is applicable to the other compounds herein disclosed, although the instability of some of them or of the resulting acids may make it impractical for operation on a scale of any large size.

The use of the oxidizing compounds of this invention for oxidation reactions will now be described by reference to a few examples. For instance, anthraquinone may be made readily by treating anthracene with any of the oxidizing compounds described,—such as tertiary butyl chromate. The anthracene, which may be first dissolved in tertiary butyl alcohol if desired, is added to the oxidizing compound, and the mixture is then heated to boiling and filtered. The precipitate, which may then be washed and dried in customary manner, is anthraquinone.

In similar manner, isoborneol may be oxidized to camphor, and isoeugenol to vanillin. These reactions have heretofore been carried out by rather involved and expensive series of steps. Isoborneol and isoeugenol are readily soluble in tertiary butyl alcohol, and may, for example, be added in such solution to the tertiary butyl chromate. Direct oxidation proceeds. The product is separated out, and is then washed in customary manner. Other similar reactions, some of which have been hitherto difficult or impossible, are amenable to the oxidation process of this invention.

Tertiary alcohols as obtained commercially may contain traces of secondary or primary alcohols. These should be removed when it is desired to prepare the pure oxides or their compounds with tertiary alcohols in pure form. One way of removing secondary or primary alcohols is to treat the tertiary alcohol containing them with a small amount of chromic acid,—enough to react with these alcohols and destroy them (by oxidation). The resulting small amounts (which may be mere traces) of reaction substance will remain behind, on distillation to drive off the desired pure tertiary alcohol, which is then ready for use.

We claim:

1. Process of making oxidizing agents, comprising the step of dissolving an oxidizing acid in an excess of a tertiary alcohol.

2. Process of making oxidizing agents, comprising the step of dissolving the anhydride of an oxidizing acid in an excess of a tertiary alcohol.

3. Process of making oxidizing agents, comprising the step of dissolving an oxidizing acid in an excess of tertiary butyl alcohol.

4. Process of making oxidizing agents, comprising the step of dissolving the anhydride of an oxidizing acid in an excess of tertiary butyl alcohol.

5. Process of making oxidizing solutions that are solvents for organic compounds, comprising the step of dissolving aqueous chromic acid in an excess of a tertiary alcohol.

6. Process of making oxidizing solutions that are solvents for organic compounds, comprising the step of dissolving chromium trioxide in an excess of a tertiary alcohol.

7. Process of making an oxidizing agent, comprising the steps of preparing an aqueous solution of an oxidizing acid, mixing the same with an excess of a tertiary alcohol, and adding to the resulting solution a preferential solute with respect to the water, whereby a two-phase liquid is produced.

8. Process of making an oxidizing agent, comprising the steps of preparing an aqueous solution of an oxidizing acid by means of acidifying a salt of said acid, and mixing the same with an excess of a tertiary alcohol, whereby a two-phase liquid is produced.

9. The process comprising adding sulfuric acid to an aqueous solution of sodium bichromate to form sodium sulfate and chromic acid in water solution, cooling the resultant solution to at least substantially 35° C., and adding a stable tertiary alcohol to said solution to cause extraction of the chromic acid by the tertiary alcohol.

10. Process of purifying oxidizing acids comprising extracting them with a tertiary alcohol and subsequently separating them from the tertiary alcohol.

11. That step in the preparation of an oxidizing agent which comprises mixing an aqueous solution of an oxidizing acid with a tertiary alcohol free from both secondary and primary alcohols.

12. An oxidizing reagent, characterized by containing an ester of a tertiary alcohol with an oxidizing acid, in the presence of a substantial excess of the alcohol.

13. An oxidizing reagent, characterized by containing an oxidizing acid, in the presence of a substantial excess of a tertiary alcohol.

14. An ester of a tertiary alcohol with a true "per"-acid.

15. Tertiary butyl permanganate.

16. Tertiary butyl persulfate.

17. A reagent suitable for various chemical reactions, comprising tertiary butyl chromate dissolved in a tertiary alcohol.

18. Method of oxidizing substances soluble in a tertiary alcohol, comprising the step of treating the substance to be oxidized with an oxidizing compound characterized by containing the reaction product of a tertiary alcohol and an oxidizing acid in solution in a tertiary alcohol.

19. Method of oxidizing substances soluble in tertiary butyl alcohol, comprising the step of treating the same with tertiary butyl chromate in solution in tertiary butyl alcohol.

20. Method of oxidizing substances soluble in a tertiary alcohol, comprising the step of treating the same with the permanganate of a tertiary alcohol in solution in a tertiary alcohol.

21. A process for producing anthraquinone, consisting of mixing a tertiary butyl alcohol solution of anthracene with a solution of tertiary butyl chromate in tertiary butyl alcohol to oxidize the anthracene into anthraquinone, and separating the anthraquinone.

22. Process of effecting chemical reactions, comprising the steps of preparing a reacted mixture by dissolving an oxidizing acid in an excess of a tertiary alcohol and oxidizing subsbtances soluble in tertiary alcohol, by treating the said substances with such reaction mixture.

23. Process of making oxidizing agents, comprising the step of dissolving chromic acid in an excess of tertiary butyl alcohol.

24. Process of making oxidizing agents, comprising the step of dissolving chromic acid anhydride in an excess of tertiary butyl alcohol.

WALLACE J. MURRAY.
EARL P. STEVENSON.